(12) United States Patent
Reesink

(10) Patent No.: US 9,343,209 B2
(45) Date of Patent: May 17, 2016

(54) OPEN-CELLED, POROUS SHAPED BODY FOR HEAT EXCHANGERS

(75) Inventor: Bernard Hendrik Reesink, Winterswijk-Kotten (NL)

(73) Assignee: BASF SE, Ludwigshafen (DE)

(*) Notice: Subject to any disclaimer, the term of this patent is extended or adjusted under 35 U.S.C. 154(b) by 359 days.

(21) Appl. No.: 12/990,107

(22) PCT Filed: Apr. 27, 2009

(86) PCT No.: PCT/EP2009/055023
§ 371 (c)(1),
(2), (4) Date: Oct. 28, 2010

(87) PCT Pub. No.: WO2009/133048
PCT Pub. Date: Nov. 5, 2009

(65) Prior Publication Data
US 2011/0042608 A1 Feb. 24, 2011

(30) Foreign Application Priority Data

Apr. 28, 2008 (EP) .................................. 08155255

(51) Int. Cl.
| | |
|---|---|
| *C09K 5/00* | (2006.01) |
| *H01F 1/00* | (2006.01) |
| *H01F 1/01* | (2006.01) |
| *H01F 1/053* | (2006.01) |
| *H01F 1/058* | (2006.01) |
| *B22F 3/10* | (2006.01) |
| *B22F 3/11* | (2006.01) |
| *C22C 1/04* | (2006.01) |
| *C22C 1/08* | (2006.01) |
| *F25B 21/00* | (2006.01) |

(52) U.S. Cl.
CPC .............. *H01F 1/015* (2013.01); *B22F 3/1028* (2013.01); *B22F 3/1125* (2013.01); *C22C 1/0491* (2013.01); *C22C 1/08* (2013.01); *H01F 1/053* (2013.01); *H01F 1/058* (2013.01); *C22C 2202/02* (2013.01); *F25B 21/00* (2013.01); *Y02B 30/66* (2013.01)

(58) Field of Classification Search
CPC ............. H01F 1/01; H01F 1/015; H01F 1/04; H01F 1/053; H01F 1/0556; H01F 1/0576; H01F 1/058; H01F 1/06; H01F 1/061
USPC ....... 252/70, 71, 62.3 T, 62.3 R, 67; 148/300, 148/306, 312, 313, 314, 420, 425, 426; 62/3.1, 3.2; 419/2, 30, 38
See application file for complete search history.

(56) References Cited

U.S. PATENT DOCUMENTS

| | | | |
|---|---|---|---|
| 428,057 A | 5/1890 | Tesla | |
| 3,087,807 A * | 4/1963 | Allen et al. | 75/415 |
| 3,905,775 A * | 9/1975 | Sowards et al. | 422/180 |
| 4,808,558 A * | 2/1989 | Park et al. | 501/80 |
| 5,245,825 A * | 9/1993 | Ohhashi et al. | 60/300 |
| 5,573,055 A | 11/1996 | Melling et al. | |
| 6,444,007 B1 * | 9/2002 | Knott et al. | 75/228 |
| 6,725,668 B1 | 4/2004 | Cornwall | |
| 6,852,272 B2 * | 2/2005 | Artz et al. | 419/2 |
| 7,069,729 B2 * | 7/2006 | Bruck et al. | 62/3.1 |
| 7,108,828 B2 * | 9/2006 | Lefebvre et al. | 419/2 |
| 2003/0116503 A1 | 6/2003 | Wang et al. | |
| 2004/0093877 A1 * | 5/2004 | Wada | F25B 21/00 62/114 |
| 2004/0231338 A1 | 11/2004 | Saito et al. | |
| 2005/0136281 A1 * | 6/2005 | Morales et al. | 428/613 |
| 2005/0172643 A1 * | 8/2005 | Lewis | H01F 1/017 62/3.1 |
| 2007/0048164 A1 * | 3/2007 | Demetriou et al. | 419/2 |
| 2015/0068219 A1 * | 3/2015 | Komorowski | F25B 21/00 62/3.1 |

FOREIGN PATENT DOCUMENTS

| | | |
|---|---|---|
| DE | 39 29 869 | 3/1991 |
| DE | 40 00 278 | 7/1991 |
| DE | 102 08 711 | 9/2003 |
| DE | 10 2006 015 370 | 10/2006 |
| DE | 10 2006 046 041 | 4/2008 |
| EP | 0 127 367 | 12/1984 |
| EP | 0 413 231 | 2/1991 |
| EP | 0 444 475 | 9/1991 |
| EP | 0 446 708 | 9/1991 |
| EP | 0 465 940 | 1/1992 |
| EP | 0 951 460 | 4/2003 |
| EP | 1 276 811 | 2/2005 |
| GB | 2 105 312 | 3/1983 |

(Continued)

OTHER PUBLICATIONS

DE 102006046041 A1 (Apr. 2008) EPO machine translation.*

(Continued)

*Primary Examiner* — Jane L Stanley
(74) *Attorney, Agent, or Firm* — Oblon, McClelland, Maier & Neustadt, L.L.P.

(57) ABSTRACT

An open-cell porous shaped body for heat exchangers, and process for making same, comprising a thermomagnetic material selected from, for example, a compound of the general formula (I):

$$(A_yB_{1-y})_{2+\delta}C_wD_xE_z \qquad (I)$$

where A is Mn or Co; B is Fe, Cr or Ni; at least two of C, D and E are different, have a non-vanishing concentration and are selected from P, B, Se, Ge, Ga, Si, Sn, N, As and Sb, where at least one of C, D and E is Ge or Si; δ is a number from −0.1 to 0.1; and w, x, y, z are each a number from 0 to 1, where w+x+z=1.

22 Claims, No Drawings

(56) References Cited

FOREIGN PATENT DOCUMENTS

| | | |
|---|---|---|
| JP | 2005-15911 | 1/2005 |
| JP | 2005-120391 A | 5/2005 |
| JP | 2005-120391 A2 | 5/2005 |
| JP | 2006-307332 | 11/2006 |
| JP | 2007-031831 A | 2/2007 |
| JP | 2007-291437 A2 | 11/2007 |
| KR | 10-2001-0034742 A | 4/2001 |
| WO | 2004 068512 | 8/2004 |

OTHER PUBLICATIONS

U.S. Appl. No. 13/259,882, filed Sep. 23, 2011, Seeler, et al.
Lozano et al., "Porous manganese-based magnetocaloric material for magnetic refrigeration at room temperature," Journal of Magnetism and Magnetic Materials, vol. 320, pp. e189-e192, (2008).
Tegus et al., "Transition-metal-based magnetic regrigerants for room-temperature applications," Nature, vol. 415, pp. 150-152, (Jan. 10, 2002).
International Search Report issued Jul. 14, 2009 in PCT/EP09/055023 filed Apr. 27, 2009.
U.S. Appl. No. 12/984,080, filed Jan. 4, 2011, Reesink, et al.
U.S. Appl. No. 12/852,750, filed Aug. 9, 2010, Reesink.
Office Action issued Mar. 19, 2013 in Japanese Patent Application No. 2011-512029 (with English translation).
Combined Chinese Office Action and Search Report issued Apr. 11, 2014 in Patent Application No. 200980124576.6 (with partial English language translation).
English translation of the Office Action issued Feb. 12, 2014 in Japanese Patent Application No. 2011-512029.
Combined Office Action and Search Report issued Oct. 10, 2014, in Chinese Patent Application No. 200980124576.6 with English translation of category of cited documents.
Office Action issued Mar. 31, 2015 in Korean Patent Application No. 10-2010-7026640 (with English language translation).

* cited by examiner

OPEN-CELLED, POROUS SHAPED BODY FOR HEAT EXCHANGERS

Thermomagnetic materials, also referred to as magnetocaloric materials, can be used for cooling, for example in refrigerators or air conditioning units, in heat pumps or for direct generation of power from heat without intermediate connection of a conversion to mechanical energy.

Such materials are known in principle and are described, for example, in WO 2004/068512. Magnetic cooling techniques are based on the magnetocaloric effect (MCE) and may constitute an alternative to the known vapor circulation cooling methods. In a material which exhibits a magnetocaloric effect, the alignment of randomly aligned magnetic moments by an external magnetic field leads to heating of the material. This heat can be removed from the MCE material to the surrounding atmosphere by a heat transfer. When the magnetic field is then switched off or removed, the magnetic moments revert back to a random arrangement, which leads to cooling of the material below ambient temperature. This effect can be exploited for cooling purposes; see also Nature, Vol. 415, Jan. 10, 2002, pages 150 to 152. Typically, a heat transfer medium such as water is used for heat removal from the magnetocaloric material.

The materials used in thermomagnetic generators are likewise based on the magnetocaloric effect. In a material which exhibits a magnetocaloric effect, the alignment of randomly aligned magnetic moments by an external magnetic field leads to heating of the material. This heat can be released by the MCE material into the surrounding atmosphere by a heat transfer. When the magnetic field is then switched off or removed, the magnetic moments revert back to a random alignment, which leads to cooling of the material below ambient temperature. This effect can be exploited firstly for cooling purposes, and secondly for conversion of heat to electrical energy.

The magnetocaloric generation of electrical energy is associated with magnetic heating and cooling. At the time of first conception, the process for energy generation was described as pyromagnetic energy generation. Compared to devices of the Peltier or Seebeck type, these magnetocaloric devices can have a significantly higher energy efficiency.

The research into this physical phenomenon began in the late 19$^{th}$ century, when two scientists, Tesla and Edison, filed a patent on pyromagnetic generators. In 1984, Kirol described numerous possible applications and conducted thermodynamic analyses thereof. At that time, gadolinium was considered to be a potential material for applications close to room temperature.

A pyromagnetoelectric generator is described, for example, by N. Tesla in U.S. Pat. No. 428,057. It is stated that the magnetic properties of iron or other magnetic substances can be destroyed partially or entirely or can disappear as a result of heating to a particular temperature. In the course of cooling, the magnetic properties are re-established and return to the starting state. This effect can be exploited to generate electrical power. When an electrical conductor is exposed to a varying magnetic field, the changes in the magnetic field lead to the induction of an electrical current in the conductor. When, for example, the magnetic material is surrounded by a coil and is then heated in a permanent magnetic field and then cooled, an electrical current is induced in the coil in the course of heating and cooling in each case. This allows thermal energy to be converted to electrical energy, without an intermediate conversion to mechanical work. In the process described by Tesla, iron, as the magnetic substance, is heated by means of an oven or a closed fireplace and then cooled again.

For the thermomagnetic or magnetocaloric applications, the material should permit efficient heat exchange in order to be able to achieve high efficiencies. Both in the course of cooling and in the course of power generation, the thermomagnetic material is used in a heat exchanger.

It is an object of the present invention to provide thermomagnetic shaped bodies which are suitable for use in heat exchangers, especially for cooling purposes or for power generation. These shaped bodies should allow high heat transfer, have a low flow resistance for heat exchange media and possess a high magnetocaloric density.

The object is achieved in accordance with the invention by open-cell porous shaped bodies for heat exchangers, magnetic cooling or heat pumps or thermomagnetic generators, which comprise a thermomagnetic material selected from (1) compounds of the general formula (I)

$$(A_yB_{1-y})_{2+\delta}C_wD_xE_z \tag{I}$$

where
A is Mn or Co,
B is Fe, Cr or Ni,
C, D and E at least two of C, D and E are different, have a non-vanishing concentration and are selected from P, B, Se, Ge, Ga, Si, Sn, N, As and Sb, where at least one of C, D and E is Ge or Si,
δ is a number in the range from −0.1 to 0.1,
w, x, y, z are numbers in the range from 0 to 1, where w+x+z=1;

(2) La- and Fe-based compounds of the general formulae (II) and/or (III) and/or (IV)

$$La(Fe_xAl_{1-x})_{13}H_y \text{ or } La(Fe_xSi_{1-x})_{13}H_y \tag{II}$$

where
x is a number from 0.7 to 0.95,
y is a number from 0 to 3, preferably from 0 to 2;

$$La(Fe_xAl_yCO_z)_{13} \text{ or } La(Fe_xSi_yCO_z)_{13} \tag{III}$$

where
x is a number from 0.7 to 0.95,
y is a number from 0.05 to 1−x,
z is a number from 0.005 to 0.5;

$$LaMn_xFe_{2-x}Ge \tag{IV}$$

where
x is a number from 1.7 to 1.95 and (3) Heusler alloys of the MnTP type where T is a transition metal and P is a p-doping metal having an electron count per atom e/a in the range from 7 to 8.5, (4) Gd- and Si-based compounds of the general formula (V)

$$Gd_5(Si_xGe_{1-x})_4 \tag{V}$$

where x is a number from 0.2 to 1, (5) Fe$_2$P-based compounds, (6) manganites of the perovskite type, (7) compounds which comprise rare earth elements and are of the general formulae (VI) and (VII)

$$Tb_5(Si_{4-x}Ge_x) \tag{VI}$$

where x=0, 1, 2, 3, 4, $$XTiGe \tag{VII}$$

where X=Dy, Ho, Tm, (8) Mn- and Sb- or As-based compounds of the general formulae (VIII) and (IX)

$$Mn_{2-x}Z_xSb \tag{VIII}$$

$$Mn_2Z_xSb_{1-x} \tag{IX}$$

where

Z is Cr, Cu, Zn, Co, V, As, Ge, x is from 0.01 to 0.5, where Sb may be replaced by As when Z is not As.

It has been found in accordance with the invention that the aforementioned thermomagnetic materials can be used advantageously in heat exchangers, magnetic cooling, heat pumps or thermomagnetic generators or regenerators when they have an open-cell porous structure.

According to the invention, the porosity is preferably from 5 to 95%, more preferably from 30 to 95%.

The term "open-cell" means that the shaped body has continuous channels which are formed by pores joined to one another. This allows the flow of a liquid heat carrier medium such as water, water/alcohol mixtures, water/salt mixtures or gases such as air or noble gases. Preference is given to using water or water/alcohol mixtures, where the alcohol may be a mono- or polyhydric alcohol. For example, it may be glycols.

The porosity, the pore size distribution and the proportion of continuous channels can be adjusted according to the practical requirements. The porosity should be sufficiently high that rapid heat removal through a fluid heat transfer medium can be achieved. In the case or rapid heat removal, the material can be introduced into the magnetic field or removed from it again at high frequency. In this case, the porosity is high. In order to be able to exchange a large amount of heat, a large amount of material and hence a low porosity are needed. In the case of a low porosity, a large amount of material can be introduced into the magnetic field, and a large amount of heat can be transferred. However, this can impair heat exchange via a heat carrier medium. As a result, the porosity can be selected freely according to the particular requirements, also in accordance with the thermomagnetic material used.

In one embodiment of the invention, the shaped body therefore has a low to moderate porosity of preferably from 30 to 60% and more preferably from 30 to 50%. In a further embodiment, a high-porosity shaped body has a porosity of preferably from 60 to 95% and especially from 80 to 95%.

The porosity is in each case based on the volume.

The mean pore diameter is preferably from 0.1 to 300 µm, more preferably from 0.3 to 200 µm. The mean pore diameter can also be established according to the particular requirements.

The pore diameter can be established via the particle size distribution in the production of the shaped body when the shaped body is produced by sintering of a granule, powder or compactate. Typically, the mean pore diameter is less than the mean particle diameter by a factor of from 15 to 40, especially from 20 to 30.

According to the invention, the proportion of open pores is preferably at least 30%, more preferably at least 60%, especially at least 80%, based on the pore volume.

When flow channels are present, the volume of the flow channels, based on the total volume of the porous shaped body, is preferably in the range from 10 to 80%, especially in the range from 30 to 60%.

In one embodiment, the shaped bodies have a ratio of surface to volume of at least 250 $m^2/m^3$. In a specific embodiment, the ratio of surface to volume may also be at least 500 $m^2/m^3$. The surface area is determined by the BET method, the pore volume by mercury porosimetry. It is also possible to use optical analysis methods.

In another embodiment of the invention, the mean pore size is from 250 to 5100 µm, more preferably from 635 to 5100 µm. A mean pore diameter of from 250 µm to 5100 µm corresponds to from about 100 ppi (pores per inch) to 5 ppi. 1 ppi corresponds to about 0.0254 pore per m.

For a description of suitable porosities, reference may additionally be made to US 2003/0116503 and DE-A-102 08 711.

The materials used in accordance with the invention are known in principle and some are described, for example, in WO 2004/068512.

The metal-based material is selected from the above compounds (1) to (8).

Particular preference is given in accordance with the invention to the metal-based materials selected from compounds (1), (2) and (3), and also (5).

Materials particularly suitable in accordance with the invention are described, for example, in WO 2004/068512, Rare Metals, Vol. 25, 2006, pages 544 to 549, J. Appl. Phys. 99,08Q107 (2006), Nature, Vol. 415, Jan. 10, 2002, pages 150 to 152 and Physica B 327 (2003), pages 431 to 437.

In the aforementioned compounds of the general formula (I), C, D and E are preferably identical or different and are selected from at least one of P, Ge, Si, Sn and Ga.

The metal-based material of the general formula (I) is preferably selected from at least quaternary compounds which, as well as Mn, Fe, P and if appropriate Sb, additionally comprise Ge or Si or As or Ge and Si, Ge and As or Si and As, or Ge, Si and As.

Preferably at least 90% by weight, more preferably at least 95% by weight, of component A is Mn. Preferably at least 90% by weight, more preferably at least 95% by weight, of B is Fe. Preferably at least 90% by weight, more preferably at least 95% by weight, of C is P. Preferably at least 90% by weight, more preferably at least 95% by weight, of D is Ge. Preferably at least 90% by weight, more preferably at least 95% by weight, of E is Si.

The material preferably has the general formula MnFe$(P_w Ge_x Si_z)$.

x is preferably a number in the range from 0.3 to 0.7, w is less than or equal to 1−x and z corresponds to 1−x−w.

The material preferably has the crystalline hexagonal $Fe_2P$ structure. Examples of suitable materials are MnFeP$_{0.45\ to\ 0.7}$, Ge$_{0.55\ to\ 0.30}$ and MnFeP$_{0.55\ to\ 0.70}$, (Si/Ge)$_{0.5\ to\ 0.30}$.

Suitable compounds are additionally $M_{n1+x}Fe_{1-x}P_{1-y}Ge_y$, with x in the range from −0.3 to 0.5, y in the range from 0.1 to 0.6. Likewise suitable are compounds of the general formula $Mn_{1+x}Fe_{1-x}P_{1-y}Ge_{y-z}Sb_z$ with x in the range from −0.3 to 0.5, y in the range from 0.1 to 0.6 and z less than y and less than 0.2. Also suitable are compounds of the formula $Mn_{1+x}Fe_{1-x}P_{1-y}Ge_{y-z}Si_z$ with x in the range from 0.3 to 0.5, y in the range from 0.1 to 0.66, z less than or equal to y and less than 0.6.

Also suitable are further $Fe_2P$-based compounds proceeding from $Fe_2P$ and $FeAs_2$, optionally Mn and P. They correspond, for example, to the general formulae $MnFe_{1-x}Co_xGe$, where x=0.7-0.9, $Mn_{5-x}Fe_xSi_3$ where x=0-5, $Mn_5Ge_{3-x}Si_x$ where x=0.1-2, $Mn_5Ge_{3-x}Sb_x$ where x=0-0.3, $Mn_{2-x}Fe_xGe_2$ where x=0.1-0.2 $(Fe_{1-x}Mn_x)_3C$ where x= . . . - . . . , $Mn_{3-x}Co_xGaC$ where x=0-0.05.

Preferred La- and Fe-based compounds of the general formulae (II) and/or (III) and/or (IV) are La(Fe$_{0.90}$Si$_{0.10}$)$_{13}$, La(Fe$_{0.89}$Si$_{0.11}$)$_{13}$, La(Fe$_{0.880}$Si$_{0.120}$)$_{13}$, La(Fe$_{0.877}$Si$_{0.123}$)$_{13}$, LaFe$_{11.8}$Si$_{1.2}$, La(Fe$_{0.88}$Si$_{0.12}$)$_{13}$H$_{0.5}$, La(Fe$_{0.88}$Si$_{0.12}$)$_{13}$H$_{1.0}$, LaFe$_{11.7}$Si$_{1.3}$H$_{1.1}$, LaFe$_{11.57}$Si$_{1.43}$H$_{1.3}$, La(Fe$_{0.88}$S$_{0.12}$)H$_{1.5}$, LaFe$_{11.2}$Co$_{0.7}$Si$_{1.1}$, LaFe$_{11.5}$Al$_{1.5}$C$_{0.1}$, LaFe$_{11.5}$Al$_{1.5}$C$_{0.2}$, LaFe$_{11.5}$Al$_{1.5}$C$_{0.4}$, LaFe$_{11.5}$Al$_{1.5}$Co$_{0.5}$, La(Fe$_{0.94}$Co$_{0.06}$)$_{11.83}$Al$_{1.17}$, La(Fe$_{0.92}$Co$_{0.08}$)$_{11.83}$Al$_{1.17}$.

Suitable manganese-comprising compounds are MnFeGe, MnFe$_{0.9}$Co$_{0.1}$Ge, MnFe$_{0.8}$Co$_{0.2}$Ge, MnFe$_{0.7}$Co$_{0.3}$Ge, MnFe$_{0.6}$Co$_{0.4}$Ge, MnFe$_{0.5}$Co$_{0.5}$Ge, MnFe$_{0.4}$Co$_{0.6}$Ge, MnFe$_{0.3}$Co$_{0.7}$Ge, MnFe$_{0.2}$Co$_{0.8}$Ge, MnFe$_{0.15}$Co$_{0.85}$Ge, MnFe$_{0.1}$Co$_{0.9}$Ge, MnCoGe, Mn$_5$Ge$_{2.5}$Si$_{0.5}$, Mn$_5$Ge$_2$Si, $Mn_5Ge_{1.5}Si_{1.5}$, $Mn_5GeSi_2$, $Mn_5Ge_3$, $Mn_5Ge_{2.9}Sb_{0.1}$, $Mn_5Ge_{2.8}Sb_{0.2}$, $Mn_5Ge_{2.7}Sb_{0.3}$, $LaMn_{1.9}Fe_{0.1}Ge$, $LaMn_{1.85}Fe_{0.15}Ge$, $LaMn_{1.8}Fe_{0.2}Ge$, $(Fe_{0.9}Mn_{0.1})_3C$, $(Fe_{0.8}Mn_{0.2})_3C$, $(Fe_{0.7}Mn_{0.3})_3C$, $Mn_3GaC$, $MnAs$, $(Mn,Fe)As$, $Mn_{1+\delta}As_{0.8}Sb_{0.2}$, $MnAs_{0.75}Sb_{0.25}$, $Mn_{1.1}As_{0.75}Sb_{0.25}$, $Mn_{1.5}As_{0.75}Sb_{0.25}$ Heusler alloys suitable in accordance with the invention are, for example, $Ni_2MnGa$, $Fe_2MnSi_{1-x}Ge_x$ with x=0-1 such as $Fe_2MnSi_{0.5}Ge_{0.5}$, $Ni_{52.9}Mn_{22.4}Ga_{24.7}$, $Ni_{50.9}Nn_{24.7}Ga_{24.4}$, $Ni_{55.2}Mn_{18.6}Ga_{26.2}$, $Ni_{51.6}Mn_{24.7}Ga_{23.8}$, $Ni_{52.7}Mn_{23.9}Ga_{23.4}$, $CoMnSb$, $CoNb_{0.2}Mn_{0.8}Sb$, $CoNb_{0.4}Mn_{0.6}SB$, $CoNb_{0.6}Mn_{0.4}Sb$, $Ni_{50}Mn_{35}Sn_{15}$, $Ni_{50}Mn_{37}Sn_{13}$, $MnFeP_{0.45}As_{0.55}$, $MnFeP_{0.47}As_{0.53}$, $Mn_{1.1}Fe_{0.9}P_{0.47}As_{0.53}$, $MnFeP_{0.89-x}Si_xGe_{0.11}$, x=0.22, x=0.26, x=0.30, X=0.33.

Additionally suitable are $Fe_{90}Zr_{10}$, $Fe_{82}Mn_8Zr_{10}$, $Co_{66}Nb_9Cu_1Si_{12}B_{12}$, $Pd_{40}Ni_{22.5}Fe_{17.5}P_{20}$, $FeMoSiBCuNb$, $Gd_{70}Fe_{30}$, $GdNiAl$, $NdFe_{12}B_6GdMn_2$.

Manganites of the perovskite type are, for example, $La_{0.6}Ca_{0.4}Mn_{0.3}$, $La_{0.67}Ca_{0.33}MnO_3$, $La_{0.8}Ca_{0.2}MnO_3$, $La_{0.7}Ca_{0.3}MnO_3$, $La_{0.958}Li_{0.025}Ti_{0.1}Mn_{0.9}O_3$, $La_{0.65}Ca_{0.35}Ti_{0.1}Mn_{0.9}O_3$, $La_{0.799}Na_{0.199}MnO_{2.97}$, $La_{0.88}Na_{0.099}Mn_{0.977}O_3$, $La_{0.877}K_{0.096}Mn_{0.974}O_3$, $La_{0.65}Sr_{0.35}Mn_{0.95}Ca_{0.05}O_3$, $La_{0.7}Nd_{0.1}Na_{0.2}MnO_3$, $La_{0.5}Ca_{0.3}Sr_{0.2}MnO_3$.

Gd- and Si-based compounds of the general formula (V)

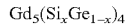

$$Gd_5(Si_xGe_{1-x})_4$$

where x is a number from 0.2 to 1
are, for example, $Gd_5(Si_{0.5}Ge_{0.5})_4$, $Gd_5(Si_{0.425}Ge_{0.575})_4$, $Gd_5(Si_{0.45}Ge_{0.55})_4$, $Gd_5(Si_{0.365}Ge_{0.635})_4$, $Gd_5(Si_{0.3}Ge_{0.7})_4$, $Gd_5(Si_{0.25}Ge_{0.75})_4$.

Compounds comprising rare earth elements are $Tb_5(Si_{4-x}Ge_x)$ with x=0, 1, 2, 3, 4 or XTiGe with X=Dy, Ho, Tm, for example $Tb_5Si_4$, $Tb_5(Si_3Ge)$, $Tb(Si_2Ge_2)$, $Tb_5Ge_4$, $DyTiGe$, $HoTiGe$, $TmTiGe$.

Mn- and Sb- or As-based compounds of the general formulae (VIII) and (IX) preferably have the definitions of z=0.05 to 0.3, Z=Cr, Cu, Ge, As, Co.

The thermomagnetic materials used in accordance with the invention can be produced in any suitable manner.

The thermomagnetic materials are produced, for example, by solid phase reaction of the starting elements or starting alloys for the material in a ball mill, subsequent pressing, sintering and heat treatment under inert gas atmosphere and subsequent slow cooling to room temperature. Such a process is described, for example, in J. Appl. Phys. 99, 2006, 08Q107.

Processing via melt spinning is also possible. This makes possible a more homogeneous element distribution which leads to an improved magnetocaloric effect; cf. Rare Metals, Vol. 25, October 2006, pages 544 to 549. In the process described there, the starting elements are first induction-melted in an argon gas atmosphere and then sprayed in the molten state through a nozzle onto a rotating copper roller. There follows sintering at 1000° C. and slow cooling to room temperature.

In addition, reference may be made to WO 2004/068512 for the production.

The materials obtained by these processes frequently exhibit high thermal hysteresis. For example, in compounds of the $Fe_2P$ type substituted by germanium or silicon, large values for thermal hysteresis are observed within a wide range of 10 K or more.

Preference is therefore given to a process for producing the thermomagnetic materials, comprising the following steps:
a) reacting chemical elements and/or alloys in a stoichiometry which corresponds to the metal-based material in the solid and/or liquid phase,
b) if appropriate converting the reaction product from stage a) to a solid,
c) sintering and/or heat treating the solid from stage a) or b),
d) quenching the sintered and/or heat-treated solid from stage c) at a cooling rate of at least 100 K/s.

The thermal hysteresis can be reduced significantly and a large magnetocaloric effect can be achieved when the metal-based materials are not cooled slowing to ambient temperature after the sintering and/or heat treatment, but rather are quenched at a high cooling rate. This cooling rate is at least 100 K/s. The cooling rate is preferably from 100 to 10 000 K/s, more preferably from 200 to 1300 K/s. Especially preferred cooling rates are from 300 to 1000 K/s.

The quenching can be achieved by any suitable cooling processes, for example by quenching the solid with water or aqueous liquids, for example cooled water or ice/water mixtures. The solids can, for example, be allowed to fall into ice-cooled water. It is also possible to quench the solids with subcooled gases such as liquid nitrogen. Further processes for quenching are known to those skilled in the art. What is advantageous here is controlled and rapid cooling.

The rest of the production of the thermomagnetic materials is less critical, provided that the last step comprises the quenching of the sintered and/or heat-treated solid at the inventive cooling rate. The process may be applied to the production of any suitable thermomagnetic materials for magnetic cooling, as described above.

In step (a) of the process, the elements and/or alloys which are present in the later thermomagnetic material are converted in a stoichiometry which corresponds to the thermomagnetic material in the solid or liquid phase.

Preference is given to performing the reaction in stage a) by combined heating of the elements and/or alloys in a closed vessel or in an extruder, or by solid phase reaction in a ball mill. Particular preference is given to performing a solid phase reaction, which is effected especially in a ball mill. Such a reaction is known in principle; cf. the documents cited above. Typically, powders of the individual elements or powders of alloys of two or more of the individual elements which are present in the later thermomagnetic material are mixed in pulverulent form in suitable proportions by weight. If necessary, the mixture can additionally be ground in order to obtain a microcrystalline powder mixture. This powder mixture is preferably heated in a ball mill, which leads to further communication and also good mixing, and to a solid phase reaction in the powder mixture. Alternatively, the individual elements are mixed as a powder in the selected stoichiometry and then melted.

The combined heating in a closed vessel allows the fixing of volatile elements and control of the stoichiometry. Specifically in the case of use of phosphorus, this would evaporate easily in an open system.

The reaction is followed by sintering and/or heat treatment of the solid, for which one or more intermediate steps can be provided. For example, the solid obtained in stage a) can be subjected to shaping before it is sintered and/or heat treated.

Alternatively, it is possible to send the solid obtained from the ball mill to a melt-spinning process. Melt-spinning processes are known per se and are described, for example, in Rare Metals, Vol. 25, October 2006, pages 544 to 549, and also in WO 2004/068512.

In these processes, the composition obtained in stage a) is melted and sprayed onto a rotating cold metal roller. This spraying can be achieved by means of elevated pressure upstream of the spray nozzle or reduced pressure downstream of the spray nozzle. Typically, a rotating copper drum or roller is used, which can additionally be cooled if appropriate. The copper drum preferably rotates at a surface speed of from 10 to 40 m/s, especially from 20 to 30 m/s. On the copper drum, the liquid composition is cooled at a rate of preferably from $10^2$ to $10^7$ K/s, more preferably at a rate of at least $10^4$ K/s, especially with a rate of from 0.5 to $2\times10^6$ K/s.

The melt-spinning, like the reaction in stage a) too, can be performed under reduced pressure or under an inert gas atmosphere.

The melt-spinning achieves a high processing rate, since the subsequent sintering and heat treatment can be shortened. Specifically on the industrial scale, the production of the thermomagnetic materials thus becomes significantly more economically viable. Spray-drying also leads to a high processing rate. Particular preference is given to performing melt spinning.

Alternatively, in stage b), spray cooling can be carried out, in which a melt of the composition from stage a) is sprayed into a spray tower. The spray tower may, for example, additionally be cooled. In spray towers, cooling rates in the range from $10^3$ to $10^5$ K/s, especially about $10^4$ K/s, are frequently achieved.

The sintering and/or heat treatment of the solid is effected in stage c) preferably first at a temperature in the range from 800 to 1400° C. for sintering and then at a temperature in the range from 500 to 750° C. for heat treatment. For example, the sintering can then be effected at a temperature in the range from 500 to 800° C. For shaped bodies/solids, the sintering is more preferably effected at a temperature in the range from 1000 to 1300° C., especially from 1100 to 1300° C. The heat treatment can then be effected, for example, at from 600 to 700° C.

The sintering is performed preferably for a period of from 1 to 50 hours, more preferably from 2 to 20 hours, especially from 5 to 15 hours. The heat treatment is performed preferably for a period in the range from 10 to 100 hours, more preferably from 10 to 60 hours, especially from 30 to 50 hours. The exact periods can be adjusted to the practical requirements according to the materials.

In the case of use of the melt-spinning process, the period for sintering or heat treatment can be shortened significantly, for example to periods of from 5 minutes to 5 hours, preferably from 10 minutes to 1 hour. Compared to the otherwise customary values of 10 hours for sintering and 50 hours for heat treatment, this results in a major time advantage.

The sintering/heat treatment results in partial melting of the particle boundaries, such that the material is compacted further.

The melting and rapid cooling in stage b) thus allows the duration of stage c) to be reduced considerably. This also allows continuous production of the thermomagnetic materials.

The inventive open-cell porous shaped body may be present, for example, in the form of an open-cell foam. It may be present, for example, in the form of a slab, honeycomb, a monolith, or in the form of a coating on a substrate.

The open-cell porous structure can be produced by a multitude of processes.

One process for producing the shaped bodies comprises subjecting a powder of the thermomagnetic material to shaping, in which the particles of the powder are bonded such that the open-cell porous structure forms. The powder can be processed, for example, by pressing, if appropriate in conjunction with a heat treatment, or by a sintering process or by a foam formation process.

In the case of processing by pressing, the powder of the thermomagnetic material is present in a specific particle size distribution which ensures the desired porosity. The mean particle diameter for this application is preferably from 20 to 30 times the desired mean pore diameter. At the same time, the powder is pressed into a shape suitable for heat transfer. The pore size distribution is established by the particle size distribution and the pressure applied. It is also possible to use additives in order to improve the pressing properties and the properties of the pressing product. For example, lubricants or tableting aids can be used. An optimal pore size distribution is guided by the required parameters for the pressure drop and should be optimized so as to minimize energy losses.

The pressing can be carried out, for example, as cold pressing or as hot pressing. The pressing may be followed by the sintering process already described.

In the sintering process or sintered metal process, the powders of the thermomagnetic material are first converted to the desired shape of the shaped body, and then bonded to one another by sintering, which affords the desired shaped body. The sintering can likewise be carried out as described above.

A foam formation process can be carried out in any suitable manner; for example, an inert gas is blown into a melt of the thermomagnetic material so as to result in an open-cell, porous structure. The use of other blowing agents is also possible.

Foam can also be formed by vigorous beating, shaking, spraying or stirring the melt of the thermomagnetic material.

It is also possible in accordance with the invention to introduce the powder of the thermomagnetic material into a polymeric binder, to subject the resulting thermoplastic molding material to a shaping, to remove the binder and to sinter the resulting green body. It is also possible to coat the powder of the thermomagnetic material with a polymeric binder and to subject it to shaping by pressing, if appropriate with heat treatment.

According to the invention, it is possible to use any suitable organic binders which can be used as binders for thermomagnetic materials. These are especially oligomeric or polymeric systems, but it is also possible to use low molecular weight organic compounds, for example sugars.

For example, it is possible to use paraffin waxes or synthetic organic resins such as polystyrene. In addition, it is possible to use polyethylene glycols which have, for example, a molecular weight in the range from 4000 to 8000, preferably from 5000 to 7000. Such binder systems are described, for example, in GB-A-2 105 312 and EP-A-0 127 367. Such systems are also referred to in U.S. Pat. No. 5,573,055, for example.

Useful organic binders include especially natural and synthetic polymers. Natural polymers are, for example, cellulose and cellulose derivatives such as carboxymethylcellulose, cellulose acetate, cellulose acetobutyrates, and also other cellulose esters and cellulose ethers. Further cellulose derivatives can be formed by oxidation reactions or by water elimination. In this connection, reference may be made to the headings of "Cellulose", "Cellulose-Derivate" [cellulose derivatives], "Cellulose-Ester" [cellulose esters] and "Cellulose-Ether" [cellulose ethers] in Römpp, Chemielexikon, $9^{th}$ ed.

Further natural polymers are casein or starch.

In addition, polysaccharides and also low molecular weight sugars may be used. Suitable synthetic binders are, for example, polyvinylpyrrolidone and polymers derived therefrom such as vinylpyrrolidone-styrene copolymers, vinylpyrrolidone-vinyl acetate copolymers and similar polymers. It is also possible to use polyalkylene glycols and ethers thereof, especially polyethylene glycol. The polymers may be used in pulverulent, particulate or latex form.

Additionally useful are the industrial polymers such as polyolefins, for example polyethylenes and polypropylenes, polystyrenes, polyvinyl chlorides, polyamides, polyurethanes, polyesters, polyethers, polysulfones, polyetherketones, polycarbonates, etc. It is also possible in accordance with the invention to use polymeric resins, for example polyester resins or epoxy resins. These may be one-component or two-component systems. Organic binders are typically used in amounts of 0.5-10% by weight based on the overall salt mixture.

Usable polymer dispersions may be based, for example, on acrylic esters or styrene/butadiene.

Examples of suitable polymers are polystyrene, polyethylene, polyvinyl chloride, polybutadiene, polyacrylonitrile, polymethyl methacrylates, polyethylene terephthalates, nylon 6, nylon 66. Specific polymer classes are acetals, polyamides, polyamide imides, polyarylates, polycarbonates, polyesters, polyethers, polyetherketones, polyetherimides, polyimides, polyphenylene oxides, polyphenylene sulfides and polysulfones. Resins may include especially phenol-formaldehyde resins, urea-formaldehyde resins, unsaturated polyester resins, epoxy resins and melamine-formaldehyde resins. Rubbers may include especially styrene-butadiene rubbers, polybutadiene rubbers, ethylene-propylene rubbers, polychloroprene rubbers, polyisoprene rubbers, nitrile rubbers, butyl rubbers, silicone rubbers and urethane rubbers.

The polymers may be polymerized free-radically, anionically, cationically or by means of radiation. Organic polymers used in accordance with the invention are especially vinylic polymers. These copolymers can be applied by any suitable processes to the salts to form the solidified salt cores. They can, for example, be applied in molten or dissolved form. The amounts needed and suitable in the individual case can be determined by the person skilled in the art by simple manual tests.

A specific class of suitable polymers is that of polyacetals, especially polyoxymethylenes and copolymers thereof. These are frequently used instead of paraffin or polyolefin dispersants. It is also possible to use mixtures of polyoxymethylene homo- or copolymers and a polymer immiscible therewith as a binder. Polyoxymethylene homo- or copolymers preferably have a melting point of at least 150° C. and molecular weights (weight-average) in the range from 5000 to 150 000. It is possible, for example, to use mixtures of polyoxymethylene, homo- and copolymers and polymers based on olefins, vinylaromatic monomers, vinyl esters, vinyl alkyl ethers or alkyl methacrylates. Suitable polymers are described, for example, in EP-B-0 5951 460 and EP-B-1 276 811. For polyoxymethylenes, in addition, reference may be made to EP-A-0 413 231, EP-A-0 444 475, EP-A-0 465 940 and EP-A-0 446 708. To remove the binder, it can be treated with a gaseous, acid-containing atmosphere. Corresponding processes are described, for example, in DE-A-39 29 869 and DE-A-40 00 278, and also EP-B-1 276 811 and EP-B-0 951 460.

As binders of organic polymers suitable in accordance with the invention are, for example, especially the polymers used for injection molding applications.

Further suitable organic binders are, for example, bitumen and tar. For further suitable binders, reference may be made to the heading "Bindemittel" [binders] in Römpp Chemielexikon, 9$^{th}$ ed.

The thermomagnetic powder is mixed with one of the suitable organic binders and filled into a mold. This can be done, for example, by casting or injection molding. The polymer is then removed catalytically or thermally and sintered to such an extent that a porous body with open-cell structure is formed.

The powder can also be coated with the binder, for example, by spray coating, for example in a fluidized bed spray coating process. The polymer-coated material is then transferred into a mold and treated with heat and/or pressure so as to form a porous open-cell structure. In this case, the organic binder may remain as a shell on the particles. The advantage of this method is that the alloy particles are sealed to the polymer and are not in direct contact with the heat exchanger fluids. This allows the requirements on the corrosion resistance of the thermomagnetic materials to be reduced.

The particular processes are controlled so as to result in open-cell, porous shaped bodies which have a suitable combination of high heat transfer, low flow resistance and high magnetocaloric density. Preference is given to an optimal ratio of high magnetocaloric density and sufficient porosity, so as to ensure efficient heat removal and efficient heat exchange. In other words, the inventive shaped bodies exhibit a high ratio of surface to volume. By virtue of the high surface area, it is possible to transport large amounts of heat out of the material and to transfer them into a heat transfer medium. The structure should be mechanically stable in order to cope with the mechanical stresses by a fluid cooling medium. In addition, the flow resistance should be sufficiently low as to result in only a low pressure drop through the porous material. The magnetic field volume should preferably be minimized.

The open-cell porous shaped bodies obtained in accordance with the invention are preferably used in refrigerators, air conditioning units, heat pumps or heat exchangers, or in power generation by direct conversion of heat. The materials should exhibit a large magnetocaloric effect within a temperature range between −100° C. and +150° C.

The heat transfer rate limits the cycle speed and hence has a great influence on the power density.

In power generation, a coil of an electrically conductive material is arranged around the thermomagnetic material. In this coil, a current is induced through alteration of the magnetic field or of the magnetization, and can be used to perform electrical work. Preference is given to selecting the coil geometry and the geometry of the thermomagnetic material so as to result in a maximum energy yield with minimum pressure drop. The coil winding density (turns/length), the coil length, the charge resistance and the temperature change of the thermomagnetic material are important influencing parameters for the energy yield.

The thermomagnetic material is present in an external magnetic field. This magnetic field can be generated by permanent magnets or electromagnets. Electromagnets may be conventional electromagnets or superconductive magnets.

The thermomagnetic generator is preferably designed such that the thermal energy from geothermal sources or from the waste heat of industrial processes or from solar energy or solar collectors can be converted, for example, in photovoltaics. Specifically in regions with geothermal activity, the inventive thermomagnetic generator allows simple power generation exploiting geothermal heat. In industrial processes, process heat or waste heat frequently arises, which is typically discharged to the environment and is not utilized further. Wastewaters frequently also have a higher temperature on exit than on entry. The same applies to cooling water. The thermomagnetic generator thus allows the recovery of electrical energy from waste heat which is otherwise lost. By virtue of the fact that the thermomagnetic generator can be operated in the region of room temperature, it is possible to utilize this waste heat and to convert it to electrical energy. The energy conversion is effected preferably at temperatures in the range from 20 to 150° C., more preferably at temperatures in the range from 40 to 120° C.

In (concentrated) photovoltaic systems, high temperatures are frequently attained, such that it is necessary to cool. This heat to be removed can be converted to power in accordance with the invention.

For power generation, the thermomagnetic material is contacted alternately with a warm reservoir and a cool reservoir and hence subjected to a warming and cooling cycle. The cycle time is selected according to the particular technical prerequisites.

The examples which follow describe the production of thermomagnetic materials suitable for the inventive application.

EXAMPLES

Example 1

Evacuated quartz ampoules which comprised pressed samples of MnFePGe were kept at 1100° C. for 10 hours in order to sinter the powder. This sintering was followed by heat treatment at 650° C. for 60 hours in order to bring about homogenization. Instead of slow cooling in the oven to room temperature, the samples were, however, immediately quenched in water at room temperature. The quenching in water caused a certain degree of oxidation at the sample surfaces. The outer oxidized shell was removed by etching with dilute acid. The XRD patterns showed that all samples crystallized in a structure of the $Fe_2P$ type.

The following compositions were obtained:
$Mn_{1.1}Fe_{0.81}P_{0.81}Ge_{0.19}$, $Mn_{1.1}Fe_{0.9}P_{0.78}Ge_{0.22}$, $Mn_{1.1}Fe_{0.9}P_{0.75}Ge_{0.25}$ and $Mn_{1.2}Fe_{0.8}P_{0.81}Ge_{0.19}$. The values observed for the thermal hysteresis are 7 K, 5 K, 2 K and 3 K for these samples in the given sequence. Compared to a slowly cooled sample, which has a thermal hysteresis of more than 10 K, the thermal hysteresis has been greatly reduced.

The thermal hysteresis was determined in a magnetic field of 0.5 tesla.

FIG. 1 shows the isothermal magnetization of $Mn_{1.1}Fe_{0.9}B_{0.78}Ge_{0.22}$ close to the Curie temperature with a rising magnetic field. Field-induced transition behavior which leads to a large MCE is observed for magnetic fields of up to 5 tesla.

The Curie temperature can be adjusted by varying the Mn/Fe ratio and the Ge concentration, as can the value of the thermal hysteresis.

The change in the magnetic entropy, calculated from the direct current magnetization using the Maxwell relationship, for a maximum field change of from 0 to 2 tesla, is 14 J/kgK, 20 J/kgK and 12.7 J/kgK respectively for the first three samples.

The Curie temperature and the thermal hysteresis decrease with increasing Mn/Fe ratio. As a result, the MnFePGe compounds exhibit relatively large MCE values in a low field. The thermal hysteresis of these materials is very low.

Example 2

Melt-Spinning of MnFeP(GeSb)

The polycrystalline MnFeP(Ge,Sb) alloys were first produced in a ball mill with high energy input and by solid phase reaction methods, as described in WO 2004/068512 and J. Appl. Phys. 99,08 Q107 (2006). The material pieces were then introduced into a quartz tube with a nozzle. The chamber was evacuated to a vacuum of $10^{-2}$ mbar and then filled with high-purity argon gas. The samples were melted by means of a high frequency and sprayed through the nozzle owing to a pressure difference to a chamber containing a rotating copper drum. The surface speed of the copper wheel was adjustable, and cooling rates of about $10^5$ K/s were achieved. Subsequently, the spun ribbons were heat treated at 900° C. for one hour.

X-ray diffractometry reveals that all samples crystallize in the hexagonal $Fe_2P$ structure pattern. In contrast to samples not produced by the melt-spinning method, no smaller contaminant phase of MnO was observed.

The resulting values for the Curie temperature, the hysteresis and the entropy were determined for different peripheral speeds in the melt-spinning. The results are listed in Tables 1 and 2 which follow. In each case, low hysteresis temperatures were determined.

TABLE 1

| | V (m/s) | $T_C$ (K) | $\Delta T_{hys}$ (K) | $-\Delta S$ (J/kgK) |
|---|---|---|---|---|
| Ribbons | | | | |
| $Mn_{1.2}Fe_{0.8}P_{0.73}Ge_{0.25}Sb_{0.02}$ | 30 | 269 | 4 | 12.1 |
| $Mn_{1.2}Fe_{0.8}P_{0.70}Ge_{0.20}Sb_{0.10}$ | 30 | 304 | 4.5 | 19.0 |
| | 45 | 314 | 3 | 11.0 |
| $MnFeP_{0.70}Ge_{0.20}Sb_{0.10}$ | 20 | 306 | 8 | 17.2 |
| | 30 | 340 | 3 | 9.5 |
| $MnFeP_{0.75}Ge_{0.25}$ | 20 | 316 | 9 | 13.5 |
| | 40 | 302 | 8 | — |
| $Mn_{1.1}Fe_{0.9}P_{0.78}Ge_{0.22}$ | 20 | 302 | 5 | — |
| | 40 | 299 | 7 | — |
| $Mn_{1.1}Fe_{0.9}P_{0.75}Ge_{0.25}$ | 30 | 283 | 9 | 11.2 |
| $Mn_{1.2}Fe_{0.8}P_{0.75}Ge_{0.25}$ | 30 | 240 | 8 | 14.2 |
| $Mn_{1.1}Fe_{0.9}P_{0.73}Ge_{0.27}$ | 30 | 262 | 5 | 10.1 |
| Bulk | | | | |
| $MnFeP_{0.75}Ge_{0.25}$ | | 327 | 3 | 11.0 |
| $Mn_{1.1}Fe_{0.9}P_{0.81}Ge_{0.19}$ | | 260 | 7 | 14.0 |
| $Mn_{1.1}Fe_{0.9}P_{0.78}Ge_{0.22}$ | | 296 | 5 | 20.0 |
| $Mn_{1.1}Fe_{0.9}P_{0.75}Ge_{0.25}$ | | 330 | 2 | 13.0 |
| $Mn_{1.2}Fe_{0.8}P_{0.81}Ge_{0.19}$ | | 220 | 3 | 7.7 |
| $Mn_{1.2}Fe_{0.8}P_{0.75}Ge_{0.25}$ | | 305 | 3 | — |
| $Mn_{1.2}Fe_{0.8}P_{0.73}Ge_{0.27}$ | | 313 | 5 | — |
| $Mn_{1.3}Fe_{0.7}P_{0.78}Ge_{0.22}$ | | 203 | 3 | 5.1 |
| $Mn_{1.3}Fe_{0.7}P_{0.75}Ge_{0.25}$ | | 264 | 1 | — |

TABLE 2

| | $T_C$ (K) | $\Delta T_{hys}$ (K) | $-\Delta S$ (J/kgK) |
|---|---|---|---|
| Bulk | | | |
| $MnFeP_{0.75}Ge_{0.25}$ | 327 | 3 | 11.0 |
| $Mn_{1.16}Fe_{0.84}P_{0.75}Ge_{0.25}$ | 330 | 5 | 22.5 |
| $Mn_{1.18}Fe_{0.82}P_{0.75}Ge_{0.25}$ | 310 | 3 | 16.1 |
| $Mn_{1.20}Fe_{0.80}P_{0.75}Ge_{0.25}$ | 302 | 1 | 12.0 |
| $Mn_{1.22}Fe_{0.78}P_{0.75}Ge_{0.25}$ | 276 | 4 | 11.7 |
| $Mn_{1.26}Fe_{0.74}P_{0.75}Ge_{0.25}$ | 270 | 1 | 8.5 |
| $Mn_{1.1}Fe_{0.9}P_{0.81}Ge_{0.19}$ | 260 | 6 | 13.8 |
| $Mn_{1.1}Fe_{0.9}P_{0.78}Ge_{0.22}$ | 296 | 4 | 20.0 |
| $Mn_{1.1}Fe_{0.9}P_{0.77}Ge_{0.23}$ | 312 | 2 | 14.6 |
| $Mn_{1.1}Fe_{0.9}P_{0.75}Ge_{0.25}$ | 329 | 2 | 13.0 |
| Ribbons | | | |
| $Mn_{1.20}Fe_{0.80}P_{0.75}Ge_{0.25}$ | 288 | 1 | 20.3 |
| $Mn_{1.22}Fe_{0.78}P_{0.75}Ge_{0.25}$ | 274 | 2 | 15.3 |
| $Mn_{1.24}Fe_{0.76}P_{0.75}Ge_{0.25}$ | 254 | 2 | 16.4 |
| $Mn_{1.26}Fe_{0.74}P_{0.75}Ge_{0.25}$ | 250 | 4 | 14.4 |
| $Mn_{1.30}Fe_{0.70}P_{0.75}Ge_{0.25}$ | 230 | 0 | 9.8 |

The invention claimed is:
1. A process for producing an open-cell porous shaped heat exchanger body, wherein the shaped heat exchanger body comprises a thermomagnetic material selected from the group consisting of
(1) a compound of the general formula (I)

$$(A_yB_{1-y})_{2+\delta}C_wD_xE_z \quad (I)$$

wherein
A is Mn or Co,
B is Fe, Cr or Ni,
C, D and E at least two of C, D and E are different, have a non-vanishing concentration and are selected from the group consisting of P, B, Se, Ge, Ga, Si, Sn, N, As and Sb, where at least one of C, D and E is Ge or Si,
δ is a number in the range from −0.1 to 0.1,
w, x, y, z are each a number in the range from 0 to 1, where w+x+z=1;
(2) an La- and Fe-based compound of the general formulae (II) and/or (III) and/or (IV)

$$La(Fe_xAl_{1-x})_{13}H_y \text{ or } La(Fe_xSi_{1-x})_{13}H_y \quad (II)$$

wherein
x is a number from 0.7 to 0.95,
y is a number from 0 to 3;

$$La(Fe_xAl_yCo_z)_{13} \text{ or } La(Fe_xSi_yCo_z)_{13} \quad (III)$$

wherein
x is a number from 0.7 to 0.95,
y is a number from 0.05 to 1-x,
z is a number from 0.005 to 0.5;

$$LaMn_xFe_{2-x}Ge \quad (IV)$$

wherein
x is a number from 1.7 to 1.95 and
(3) a Heusler alloy of the MnTP type wherein T is a transition metal and P is a p-doping metal having an electron count per atom e/a in the range from 7 to 8.5,
(4) a Gd- and Si-based compound of the general formula (V)

$$Gd_5(Si_xGe_{1-x})_4 \quad (V)$$

wherein x is a number from 0.2 to 1,
(5) an Fe₂P-based compound,
(6) a manganite of the perovskite type,
(7) a compound which comprises a rare earth element and is of the general formulae (VI) and (VII)

$$Tb_5(Si_{4-x}Ge_x) \quad (VI)$$

wherein x=0, 1, 2, 3, 4, $$XTiGe \quad (VII)$$

wherein X=Dy, Ho, Tm, and
(8) an Mn- and Sb- or As-based compound of the general formulae (VIII) and (IX)

$$Mn_{2-x}Z_xSb \quad (VIII)$$

$$Mn_2Z_xSb_{1-x} \quad (IX)$$

wherein
Z is Cr, Cu, Zn, Co, V, As, Ge,
x is from 0.01 to 0.5,
wherein Sb may be replaced by As when Z is not As;
said process comprising
coating a powder of the thermomagnetic material with a polymeric binder and subjecting said material to a shaping by pressing, optionally with heat treatment, so that the polymeric binder remains as a shell on the particles,
wherein the polymeric binder is a two-component epoxy resin, and
wherein said porous shaped body has a porosity of 30 to 60%.

2. The process according to claim 1, wherein the thermomagnetic material comprises a quaternary compound of the general formula (I) comprising Mn, Fe, P, and at least one element selected from the group consisting of Ge, Si, and As.

3. The process according to claim 2, wherein the thermomagnetic material is (1) and wherein the quaternary compound of the general formula (I) comprises Mn, Fe, P, and Si.

4. The process according to claim 2, wherein the thermomagnetic material is (1) and wherein the quaternary compound of the general formula (I) comprises Mn, Fe, P, Ge and As.

5. The process according to claim 2, wherein the thermomagnetic material is (1) and wherein the quaternary compound of the general formula (I) comprises Mn, Fe, P, Si and As.

6. The process according to claim 2, wherein the thermomagnetic material is (1) and wherein the quaternary compound of the general formula (I) comprises Mn, Fe, P, Ge, Si and As.

7. The process according to claim 2, wherein the thermomagnetic material is (1) and wherein the quaternary compound of the general formula (I) additionally comprises Sb.

8. The process according to claim 1, which includes the heat treatment.

9. The process according to claim 1, wherein said porous shaped body has a mean pore diameter of from 0.1 to 300 μm.

10. The process according to claim 9, wherein the proportion of open pores is at least 30%.

11. The process according to claim 9, wherein the proportion of open pores is at least 60%.

12. The process according to claim 1, wherein said porous shaped body has a mean pore diameter of from 0.3 to 200 μm.

13. The process according to claim 1, wherein said porous shaped body has flow channels.

14. The process according to claim 13, wherein the volume of said flow channels, based on the total volume of said porous shaped body, is from 10 to 80%.

15. The process according to claim 1, wherein said porous shaped body has a ratio of surface to volume of at least 250 m²/m³.

16. The process according to claim 1, wherein said porous shaped body has a ratio of surface to volume of at least 500 m²/m³.

17. The process according to claim 1, wherein said porous shaped body has a mean pore size of from 250 to 5100 μm.

18. The process according to claim 1, wherein said porous shaped body has a mean pore size of from 635 to 5100 μm.

19. The process according to claim 1, which does not include foam formation.

20. The process according to claim 1, wherein the powder of the thermomagnetic material is spray coated with the polymeric binder.

21. The process according to claim 1, wherein the powder of the thermomagnetic material is spray coated with the polymeric binder in a fluidized bed.

22. The process according to claim 1, wherein coating the powder of the thermomagnetic material with the polymeric binder produces discrete particles of the thermomagnetic material coated with the polymeric binder.

* * * * *